US012591415B2

(12) United States Patent
Masad et al.

(10) Patent No.: US 12,591,415 B2
(45) **Date of Patent: \*Mar. 31, 2026**

(54) INTELLIGENT AND PREDICTIVE MODULES FOR SOFTWARE DEVELOPMENT AND CODING USING ARTIFICIAL INTELLIGENCE AND MACHINE LEARNING

(71) Applicant: Replit, Inc., Foster City, CA (US)

(72) Inventors: Amjad Masad, Palo Alto, CA (US); Reza Shabani, San Francisco, CA (US); Samip Dahal, Canal Winchester, OH (US)

(73) Assignee: Replit, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,451

(22) Filed: Mar. 7, 2024

(65) Prior Publication Data

US 2024/0281219 A1      Aug. 22, 2024

Related U.S. Application Data

(63) Continuation of application No. 18/179,551, filed on Mar. 7, 2023, now Pat. No. 12,141,554.

(60) Provisional application No. 63/486,364, filed on Feb. 22, 2023.

(51) Int. Cl.
*G06F 8/33* (2018.01)
(52) U.S. Cl.
CPC .................................... *G06F 8/33* (2013.01)

(58) Field of Classification Search
None
See application file for complete search history.

(56) References Cited

U.S. PATENT DOCUMENTS

| | | | |
|---|---|---|---|
| 9,626,283 B1 * | 4/2017 | Zlatnik | .............. G06F 11/3668 |
| 11,604,626 B1 | 3/2023 | Sawant | |
| 11,704,099 B1 | 7/2023 | Morse | |
| 2004/0205708 A1 | 10/2004 | Kothari | |

(Continued)

OTHER PUBLICATIONS

Bavarian, et al., "Efficient Training of Language Models to Fill in the Middle," arXiv:2207.14255v1, Jul. 28, 2022.

(Continued)

*Primary Examiner* — Qing Chen
(74) *Attorney, Agent, or Firm* — Blank Rome LLP

(57) ABSTRACT

An AI tool for writing computer code is generated by collecting code entry data from a plurality of remote computing devices, training a code completion network using the code entry data, wherein the code completion network is configured to predict one or more additional code entry activities based on a provided set of code entry activities, and providing the code completion network to one or more development sessions. A code segment is intelligently generated by receiving a request to modify computer code of a program in a development interface, and presenting a text input component and a code description prompt. The technique further includes receiving, via the text input component, a code description, applying at least part of the code description to a code generation network to obtain a code segment suggestion and presenting the code segment suggestion on a display.

14 Claims, 13 Drawing Sheets

(56)          References Cited

U.S. PATENT DOCUMENTS

| | | | | |
|---|---|---|---|---|
| 2007/0250816 A1* | 10/2007 | Rose | | G06Q 10/06 |
| | | | | 717/124 |
| 2008/0270981 A1 | 10/2008 | Hutchison | | |
| 2008/0295069 A1* | 11/2008 | Nicholls | | G06F 8/76 |
| | | | | 717/106 |
| 2009/0077534 A1 | 3/2009 | Peterson | | |
| 2009/0077535 A1 | 3/2009 | Peterson | | |
| 2009/0254880 A1 | 10/2009 | Gryko | | |
| 2011/0246969 A1* | 10/2011 | Lee | | H04L 63/0823 |
| | | | | 717/124 |
| 2012/0246610 A1 | 9/2012 | Asadullah | | |
| 2013/0007700 A1 | 1/2013 | Villar | | |
| 2013/0263086 A1 | 10/2013 | Carter | | |
| 2014/0173563 A1* | 6/2014 | Dias | | G06F 8/74 |
| | | | | 717/123 |
| 2015/0067640 A1 | 3/2015 | Booker | | |
| 2015/0081363 A1* | 3/2015 | Taylor | | G06Q 40/00 |
| | | | | 705/7.14 |
| 2015/0277860 A1* | 10/2015 | Hur | | G06F 8/33 |
| | | | | 717/110 |
| 2015/0378692 A1* | 12/2015 | Dang | | G06F 8/36 |
| | | | | 717/106 |
| 2017/0212829 A1* | 7/2017 | Bales | | G06F 11/3604 |
| 2018/0060044 A1 | 3/2018 | Hao | | |
| 2019/0303107 A1 | 10/2019 | Kelly | | |
| 2019/0391792 A1* | 12/2019 | Sabharwal | | G06N 3/045 |
| 2020/0167134 A1 | 5/2020 | Dey | | |
| 2020/0249918 A1* | 8/2020 | Svyatkovskiy | | G06N 3/084 |
| 2020/0272435 A1* | 8/2020 | Apte | | G06N 3/048 |
| 2020/0371778 A1* | 11/2020 | Ni | | G06F 8/70 |
| 2020/0403944 A1* | 12/2020 | Joshi | | G06F 16/2365 |
| 2021/0049220 A1 | 2/2021 | Pingol | | |
| 2021/0132913 A1* | 5/2021 | Singh | | G06F 8/33 |
| 2021/0192321 A1 | 6/2021 | Zhang | | |
| 2021/0349696 A1* | 11/2021 | Nupponen | | G06F 8/33 |
| 2022/0012018 A1* | 1/2022 | Trim | | G06N 20/00 |
| 2022/0012019 A1* | 1/2022 | Wilson-Thomas | | G06F 8/33 |
| 2022/0019411 A1* | 1/2022 | Cockrell | | G06F 8/33 |
| 2022/0138240 A1 | 5/2022 | Bahrami | | |
| 2022/0236964 A1 | 7/2022 | Bahrami | | |
| 2022/0350574 A1 | 11/2022 | Alwell | | |
| 2022/0391180 A1 | 12/2022 | Liu | | |
| 2023/0244452 A1 | 8/2023 | Li | | |
| 2024/0078092 A1* | 3/2024 | Liu | | G06F 8/35 |

OTHER PUBLICATIONS

Dahal, et al., "Scotch: A Semantic Code Search Engine for IDEs," DL4C Workshop paper at ICLR 2022.
GitHub Docs, "About GitHub Copilo for Individuals," Retrieved from the Internet: URL: https://docs.github.com/en/copilot/overview-of-github-copilot/about-github-copilot-for-individuals [retrieved on Jun. 7, 2023].

* cited by examiner

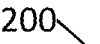
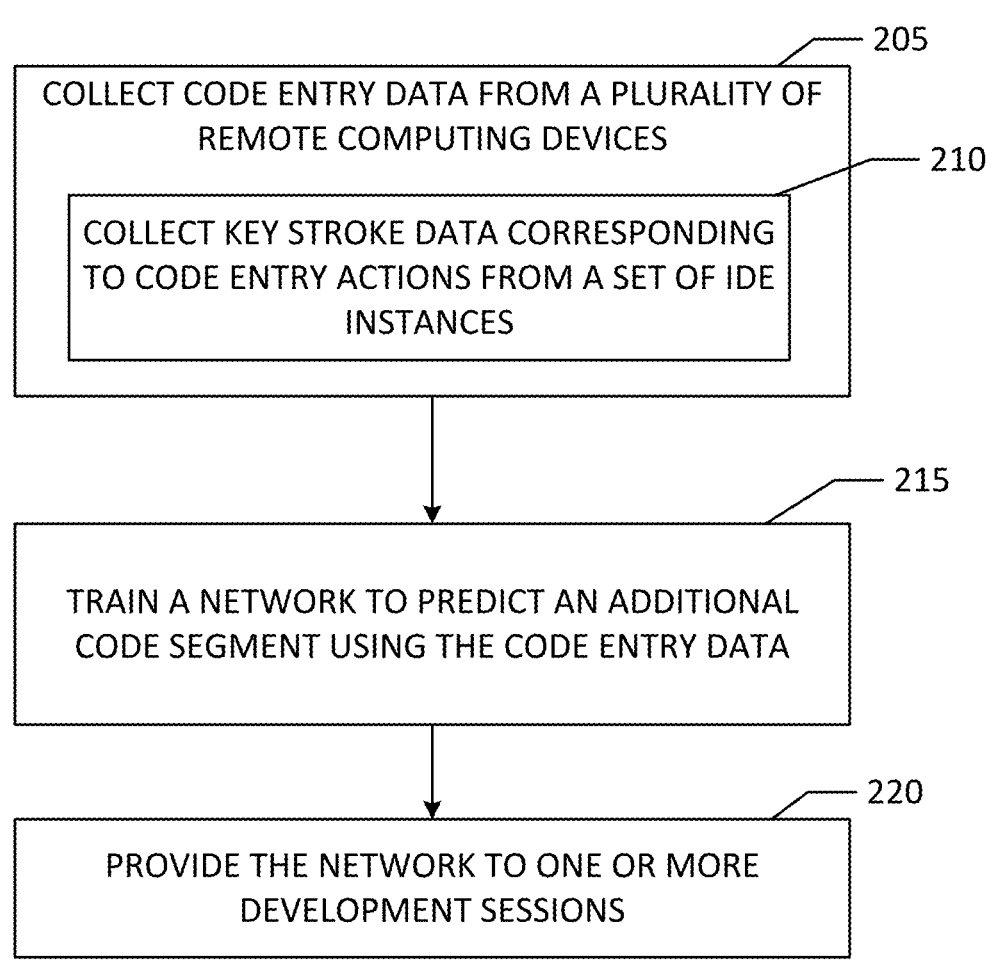
200
205
COLLECT CODE ENTRY DATA FROM A PLURALITY OF REMOTE COMPUTING DEVICES
210
COLLECT KEY STROKE DATA CORRESPONDING TO CODE ENTRY ACTIONS FROM A SET OF IDE INSTANCES
215
TRAIN A NETWORK TO PREDICT AN ADDITIONAL CODE SEGMENT USING THE CODE ENTRY DATA
220
PROVIDE THE NETWORK TO ONE OR MORE DEVELOPMENT SESSIONS
*FIG. 2*

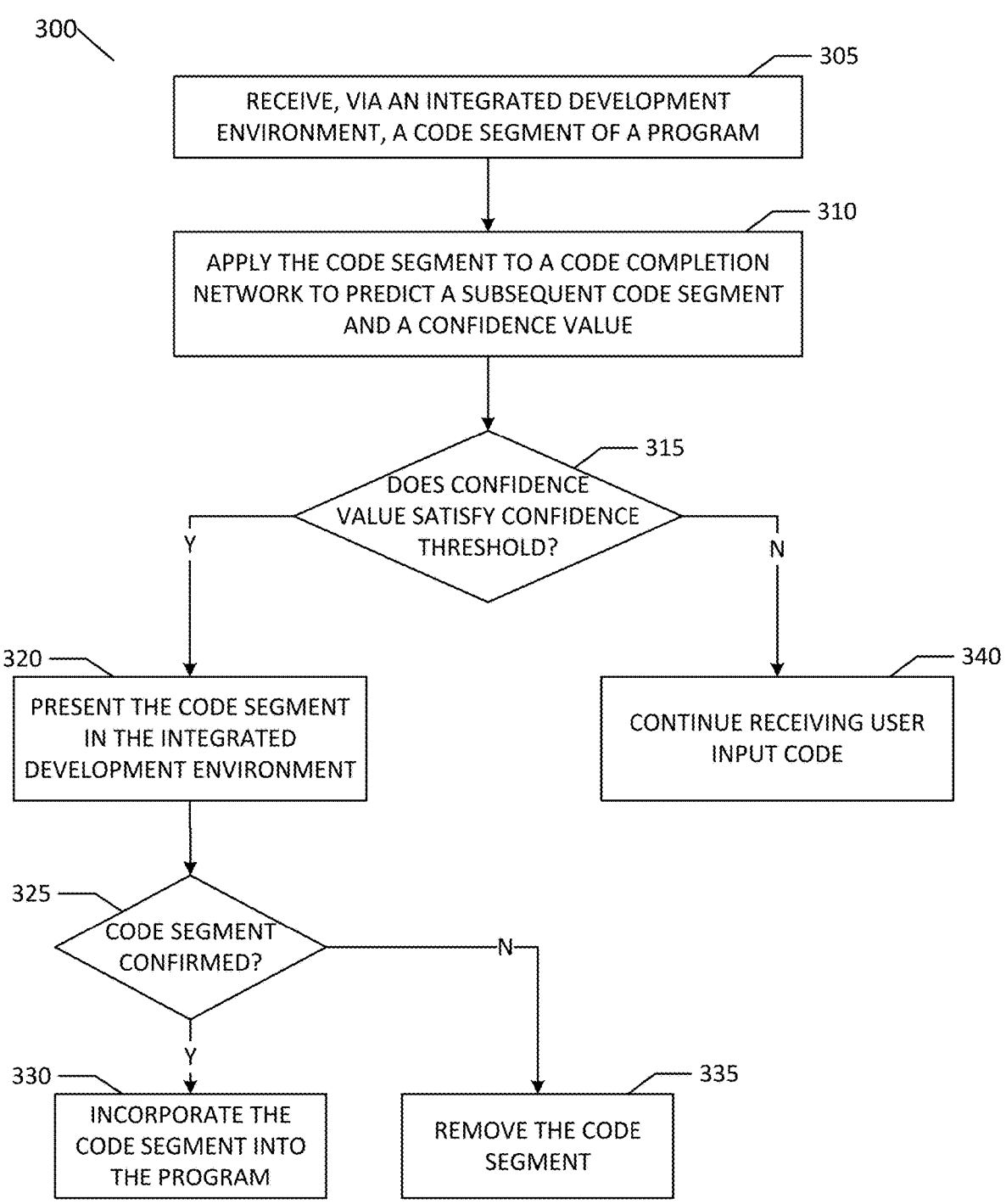

300

305
RECEIVE, VIA AN INTEGRATED DEVELOPMENT
ENVIRONMENT, A CODE SEGMENT OF A PROGRAM

310
APPLY THE CODE SEGMENT TO A CODE COMPLETION
NETWORK TO PREDICT A SUBSEQUENT CODE SEGMENT
AND A CONFIDENCE VALUE

315
DOES CONFIDENCE
VALUE SATISFY CONFIDENCE
THRESHOLD?

Y

N

320
PRESENT THE CODE SEGMENT
IN THE INTEGRATED
DEVELOPMENT ENVIRONMENT

340
CONTINUE RECEIVING USER
INPUT CODE

325
CODE SEGMENT
CONFIRMED?

N

Y

330
INCORPORATE THE
CODE SEGMENT INTO
THE PROGRAM

335
REMOVE THE CODE
SEGMENT

400C
402B
408
_FIG. 4C_
400D
410
412
_FIG. 4D_

802
800A
800B
804
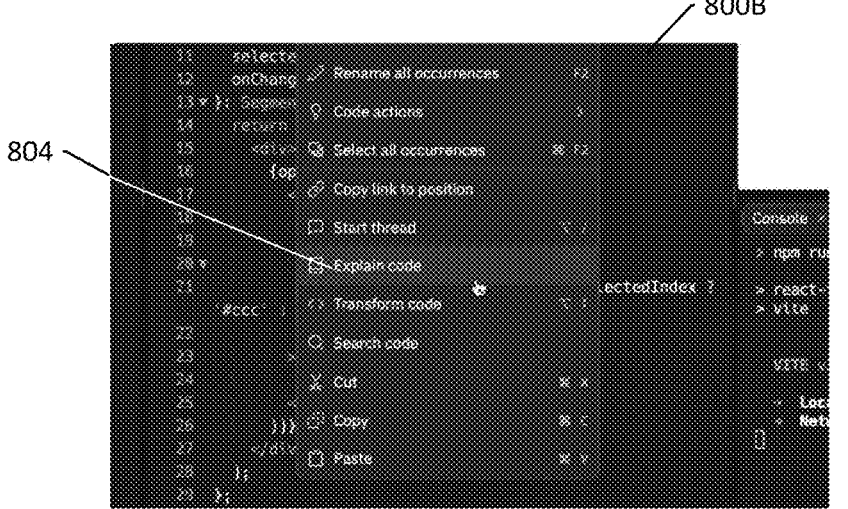
800C
806
808
*FIG. 8*

INTELLIGENT AND PREDICTIVE MODULES FOR SOFTWARE DEVELOPMENT AND CODING USING ARTIFICIAL INTELLIGENCE AND MACHINE LEARNING

BACKGROUND

Software development often requires developing or creating software programs in the form of computer code that can be very lengthy and complex. As such, creating and understanding a computer program can be difficult, particularly for novice programmers, or for programmers trying to use a mobile device for programming. Computer programmers write, modify, and test code and scripts that allow computer software and applications to function properly. Programming is a high value activity, for example, the U.S. Bureau of Labor Statistics projects programming jobs to grow over the coming decade, which also pay higher-than-average salaries. The median annual wage for computer and information technology jobs is typically about 50% higher than the median annual salary for all jobs.

Beyond creation of software itself, the difficulty in understanding computer code is particularly problematic when trying to identify discrepancies or errors that affect operation of the computer program.

BRIEF DESCRIPTION OF THE DRAWINGS

For a detailed description of various examples, reference will now be made to the accompanying drawings in which:

FIG. 2 shows a flowchart of a technique for training a code completion network, in accordance with one or more embodiments;

FIG. 3 shows a flowchart of a technique for predicting code by a code completion network, according to one or more embodiments;

FIGS. 4A-4D show example user interfaces for code completion functionality, in accordance with one or more embodiments;

FIG. 8 shows example user interfaces for code explanation functionality, in accordance with one or more embodiments;

DETAILED DESCRIPTION

Figure 1:
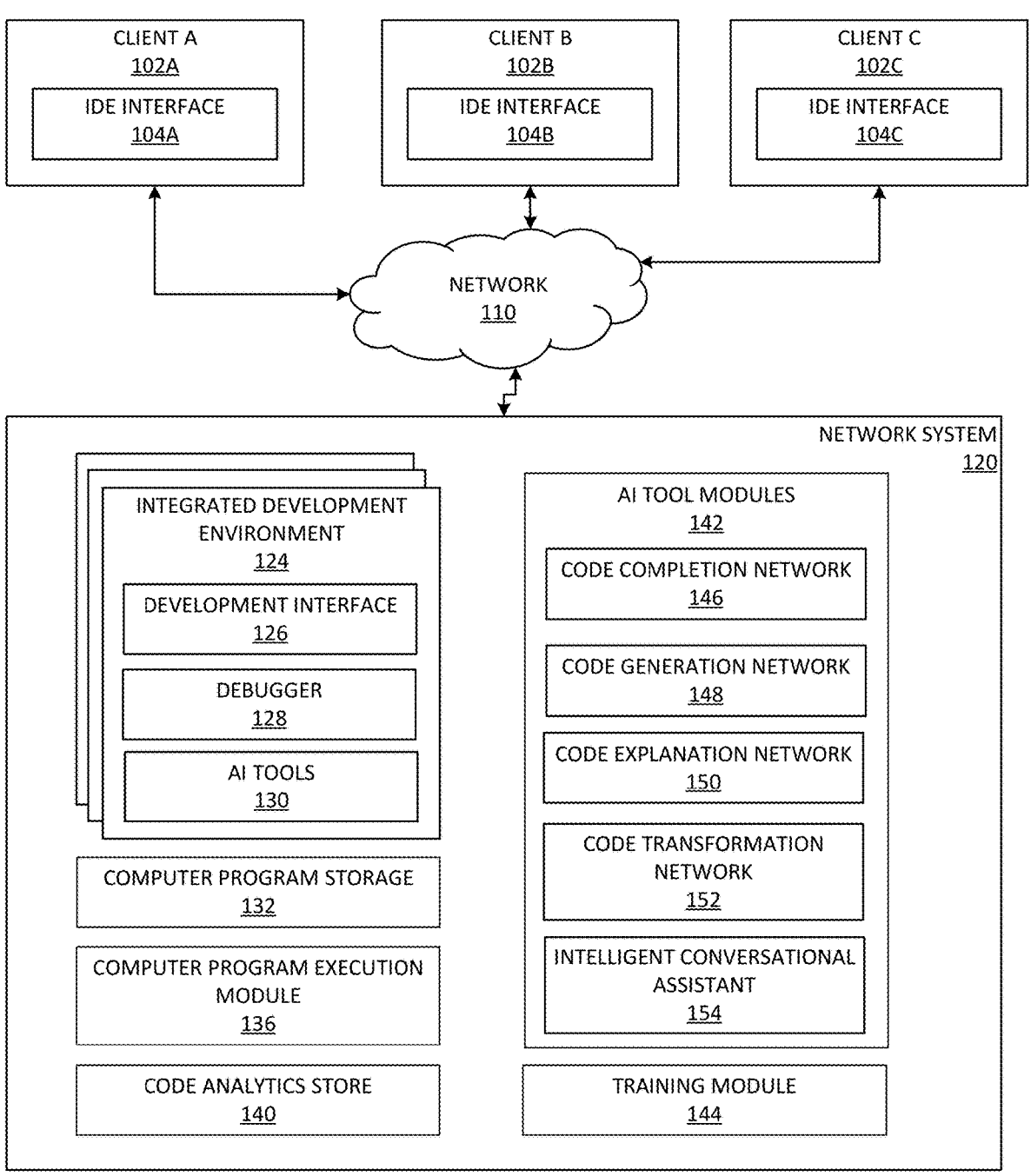
FIG. 1 shows an example network environment in which embodiments described herein may be performed, in accordance with one or more embodiments.

The following description relates to technical and user interface improvements to a program development interface to enhance the development environment for users, thereby increasing the speed at which computer code is generated and improving upon technical features within the development environment. In particular, techniques described herein are directed to a set of artificial intelligence (AI) tools which provide an ML-powered pair programmer that completes code in realtime, provides tools to generate, transform, and explain code, and an in-editor search utility that facilitates with finding and importing code from within an editor. The various tools can be implemented as a form of generative AI, in which networks trained on various types of programming data can create new content. As described here, the various generative AI tools can generate new computer code, explanations to code, text, and the like, to facilitate software development.

The development environment is improved by providing tools which overcome technical challenges to users, such as the need to repeatedly type in computer code that is often repetitive or similar. As another example, the techniques described herein provide functionality for quickly transforming code by intelligently modifying code based on natural language input by a user. In addition, techniques described herein provide networks configured to provide explanations for given computer code. These features provide various technical improvements, such as automating repetitive boilerplate code, such as function and file generation, quickly transforming and refactoring large code blocks, providing educational tools to allow users to understand code more quickly, and providing tools to automatically generate computer code based on natural language input. These tools are additionally effective in more sophisticated environments, for example by facilitating onboarding of a new team member to a project, expediting project completion, and the like.

According to some embodiments, the various tools may be trained using large language models that take into account additional signals like user feedback, compiler/runtime errors, and the like, and the tools responses or actions will reflect that training. Further, because humans do not develop computer code unidirectionally, flexibility is incorporated into the models. That is, while some language models generate content in only a forward direction, the tools described herein can be trained based on coding activities which include text input as well as other interactions between a user and a user interface during development of the code such as natural cursor movements, code edits, and the like. In addition, because code development does not happen in a silo, other relevant files in an associated file system are also considered, such as code packages or other files called from within a program. Additionally, in some embodiments, the models may make use of code before and after a cursor in a text editor of a development environment. Accordingly, the trained model considers temporal coding actions rather than simply relying on a unidirectional reading of source code.

In some embodiments, additional networks may be trained for other functionality. In one embodiment, an error correction network may be trained and provided to a user of an IDE. The error correction network may be trained to predict errors in the user code and intelligently suggest corrections to the user code. In some embodiments, the output of the error correction network may include a link into the code generation network, and will prompt the user to provide a description of the functionality intended for the code from which the errors are identified. From there, the code generation network can generate proposed code which can replace the code having the errors.

Another example of a network which may be trained on code entry data is a semantic search model. Traditional search techniques are insufficient for using natural language to search computer code, because code and natural language are two different modalities. As such, embeddings from transformer-based models can be used to power code search. Specifically, learned representations for code and queries can be obtained from a trained model which is fine-tuned to map both code and query to vectors that are close to each other in joint-vector space. A nearest neighbor matching can be conducted between the code and query vectors or representations. Such learned representations of code can encode information about the functionality of the code, in addition to other characteristics like keywords within the code, or the like. Hence, during inference, the user can search for code using natural language input by specifying what the code should do.

In some embodiments, users can search for code from inside the editor of an IDE. The semantic search model can further be trained to consider code the user has written in the editor when searching for code, thereby making the search contextual. In doing so, the semantic search model can exploit the clues present in a user's code (such as libraries being used) which enables the search to be tailored to that user's context. According to some embodiments, this is achieved by training the semantic search model to minimize the distance between single embedding of code context and query, and code.

In the following description, numerous specific details are set forth to provide a thorough understanding of the various techniques. As part of this description, some of the drawings represent structures and devices in block diagram form. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components. It should be understood that the language used in this disclosure has been principally selected for readability and instructional purposes, and may not have been selected to delineate or circumscribe the disclosed subject matter. As such, the various processes may be performed by alternate components than the ones described.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

FIG. 1 shows a network diagram of an environment in which various embodiments described herein may be practiced. Techniques described herein provide a system and method for incorporating artificial intelligence (AI) tools in the form of trained networks for in-browser coding, such as through an online integrated development environment. The network diagram includes multiple client devices, such as client A 102A, client B 102B, and client C 102C, communicably connected to a network system 120 across a network 110. Although a particular representation of components and modules is presented, it should be understood that in some embodiments, the various components and modules may be differently distributed among the devices pictured, or across additional devices not shown.

Clients 102A, 102B, and 102C may each be computing devices from which an integrated development environment (IDE) is accessed. An IDE is computer software that provides tools used by programmers to develop software. The IDE may include, for example, a source code editor, code package manager, debugger, and other programming tools. The IDE 124 may be hosted on one or more network devices of network system 120. The IDE 124 may be accessed across the network 110 via an IDE interface from each client, such as IDE interface 104A, IDE interface 104B, and IDE interface 104C. The IDE interface may be an application running on the corresponding client device, or may be accessed from a remote device such as a network device via a web browser, or the like.

The IDE 124 hosted on network system 120 may include a development interface 126, which may provide a source code editor for a computer program which is the focus of a development session by one or more programmers on the client devices 102A, 102B, and 102C. The IDE 124 may additionally include a debugger 128. Debugger 128 is a program that facilitates the detection and correction of errors in other computer programs. In addition, the debugger can be used as a tool to track the operation of other computer programs. To that end, the debugger 128 may be a program which provides a capability to monitor the execution of a program, stop the program, start the program, set breakpoints, set and read values, and the like. The debugger 128 includes logic such that it is capable of communicating with the operation system to cause the program to perform debugging actions, such as pause, continue, modify, inspect memory, and the like.

According to some embodiments, the IDE 124 may include AI tools 130. The AI tools 130 may include one or more networks or models which are trained to assist in code development. For example, the AI tools may be provided from the AI tool modules 142, from which the various tools are generated. The AI tools may include trained models which use machine learning to generate predicted output for a given input. As shown, AI tool modules 142 includes, for example, a code completion network 146, a code generation network 148, a code explanation network 150, and a code transformation network 152. In some embodiments, the IDE 124 may support multiple programming languages. As such, the tools may provide functionality for code development assistance to support multiple languages. For example, a single network may be trained to handle multiple languages, or multiple networks may be trained for different languages. In some cases, IDE 124 may access a computer program stored in a computer program storage 132. This computer program storage 132 may be a storage space provided on a per account basis. For example, an account may be associated with an individual developer (e.g., user) developing the computer program, or the account may be an organizational account associated with an organization, such as a company, corporation, etc., with multiple developers' (e.g., users') sub-accounts associated with the organizational account developing the computer program. In some cases, multiple computer programs may be associated with a single account. Code specific for the computer program, along with other data for the computer program (e.g., images, data files, etc.), may be stored in the computer program storage 132, and the computer program storage 132 may be allotted a certain amount of available storage, for example, based on a status, service tier, type, etc. of the account. In some cases, the computer program storage 132 may be a part of a container, such as a docker container, or part of a virtual machine image. The computer program storage 132 may also be hosted, for example, on a cloud service, such as Google Cloud Platform (Google is a registered trademark of Google LLC), Amazon Web Services (Amazon Web Services is a registered trademark of Amazon Technologies, Inc.), etc. The computer program may be written in any known computer programming language.

The network system 120 also includes a computer program execution module 136. While shown in this example as a separate module, it should be understood that in some cases, the computer program execution module 136 may be integrated with other components, such as the IDE 124. The computer program execution module 136 prepares and executes the computer program 126. For example, a developer of a computer program stored in computer program storage 132 may cause the computer program to be executed from the IDE 124. The computer program execution module 136 may prepare the source code for execution by performing, for example, code linking, compilation, interpreting, binding, etc. prior to executing the computer program.

In order to generate the various AI tools 130, the network system 120 can collect analytics from use of the IDE 124. These analytics may be stored in code analytics store 140. Code analytics store 140 can include, for example, source code entered by a user as well as other code entry data, such as, cursor movements, and other usage information within the IDE 124 during development of computer code. Other examples include time stamps for code entry and edits, file creation times, additions and deletions of text, use of development tools provided by the IDE, interaction with APIs or other infrastructure available to the user/program, and the like. As such, the code analytics store 140 may collect usage data derived from multiple users and multiple devices, such as client A 102A, client B 102B, and client C 102C.

The various AI tools may utilize artificial intelligence to assist programmers in creating computer code. In doing so, the various AI tools provide a form of generative AI in which the system uses user input to create new content. In particular, the various tools may utilize machine learning algorithms trained to perform various programming tasks. In general, machine learning algorithms are used to predict an output based on a given input. The AI tools may be trained using code analytics from code analytics store 140, for example, by training module 144 to predict a target portion of computer code, explain a particular portion of computer code, transform given computer code, or the like. For example, code completion network 126 may be trained by training module 144 using training data from the code analytics store 140. Additionally, or alternatively, training module 144 may take advantage of source code and other program data from computer program storage 132. Further, in some embodiments, one or more of the various AI tools may be trained or tuned based on a particular user's code activities, thereby creating custom models for individual users. As another example, a particular network may be tuned based on a particular user's code activities, for example in a post-processing manner, such that the output of the model may be refined for a particular user. In some embodiments, the IDE 124 is configured to store operational transformation edits, from which natural cursor movements and entry of text from human programmers in the code edits can be identified. According to some embodiments, generating the AI tools can include training a large language model to predict operational transformation distribution.

With respect to the code completion network 146, the network may be trained to predict how to complete a code segment in real time or near real time with low latency when providing a prediction response. For example, as a user is entering computer code, the code completion network 146 can predict and provide a proposed code segment for completion of the full code segment. A user can then accept the proposed code segment and incorporate the proposed code into a user's workspace or computer program, or can discard the proposed code segment. According to one or more embodiments, the code completion network may additionally provide code comments that include additional context for the proposed code segment.

Turning to the code generation network 148, a network can be trained to generate computer code based on a natural language description. For example, the code generation network 148 can be trained with code segments and relevant descriptions such that during runtime, a user can utilize the code generation network 148 by providing a natural language description of the target code segment from which the code generation network 148 generates a proposed code segment. In some embodiments, the code generation network 148 may use a large language model which is trained on natural language as well as computer code. A large language model is a type of neural network which is trained to parse natural language input (i.e., "plain English" or the like), to perform some tasks in accordance with the input. Here, the code generation network is trained to generate computer code based on an input prompt in natural language format.

The AI tools 130 also include a code explanation network 150. The code explanation network 150 may be based on a natural language model and configured to provide explanations for given computer code in a natural language format. For example, a user may select a portion of computer code to be considered by the code explanation network 150, and the code explanation network will provide a text response in natural language which explains the computer code. According to some embodiments, a neural network is trained on training data that includes, for example, computer code segments and explanations (for example, derived from an educational setting or a commercial setting where one user pays another user for generating code) such that the code explanation network 150 can predict an explanation of a portion of computer code used as input.

The AI tools 130 also include a code transformation network 152. The code transformation network allows a user to select a section of computer code, describe a target adjustment, for example in a natural language format, and in response, receive a proposed modified version of the selected code. The code transformation network 152 may be based on a natural language model, and the target adjustment description may be provided by a user in natural language format. The user may then accept the proposed code for insertion into the user's code workspace or reject the proposed code and request another proposal from the code transformation network 152.

In addition to training each of the networks, additional steps may be taken to fine tune the models. For example, in some embodiments, the training data may be weighted based on age such that the most recent data is most heavily weighted during the training. Other heuristic filters can be applied to discard, truncate, or otherwise transform proposed code segments. Examples include consideration of a user's prior written code, a cost to a platform to pull code segments and display to the user, a probability that the proposed code will be acceptable to the user, and the like. Additional fine tuning of the models may result in lower latency when responding to the user with a proposed code suggestion. The models may be fine-tuned, for example, with additional code such that new examples can be learned relevant to a particular domain and use. For example, the models may be fine-tuned for a particular team's code such that the models generate code and other content in a manner more relevant to the team. Additional fine tuning of the models may also result in more accurate or desirable proposed code suggestions for the user.

An additional tool may be provided in the form of an intelligent conversational assistant 154. This intelligent conversational assistant 154 may be a module provided within an IDE which provides a user with a natural language interface to obtain assistance in coding and developing software. In some embodiments, the intelligent conversational assistant may provide a n interface by which a user can utilize generative AI, such as some or all of the various AI tool modules 142 described herein. The intelligent conversational assistant may be configured to respond to a user-provided prompt as if it was a pair programmer working with the user to develop the program. The intelligent conversational assistant may respond to use prompts using the various modules described above, and based on the context of a corresponding project from which the prompt is provided. For example, if a user is developing a program having multiple files, the intelligent conversational assistant 154 can utilize not just the file from which the prompt is entered, but other files within the project currently in progress in the IDE, to determine an answer to the prompt. In some embodiments, the intelligent conversational assistant 154 can utilize as input the various code development activities described above with respect to other AI tools on the platform to determine a response to a user-provided prompt. According to one or more embodiments, when the intelligent conversational assistant 154 responds with suggested computer code, a user input component may be provided which, when selected, incorporates the computer code into the relevant program.

As another example, in some embodiments, the intelligent conversational assistant 154 may be tied into the debugger 128 such that upon an error being detected by the debugger 128, the intelligent conversational assistant 128 may automatically predict a solution to the error and present information about the predicted solution in the interface. From there, the solution can be incorporated into the program, either automatically or based on user input, such as a user copying and pasting the solution from the intelligent conversational assistant interface into the code editor of the development interface 126. In some embodiments, the information about the predicted solution may include the solution itself, such as computer code to be incorporated into the program, and/or natural language description about the solution from which the user can correct the error in the development interface 126 and/or understand why the error occurred and how to fix the error.

According to one or more embodiments, because the network system 120 provides the IDE 124 as well as the AI tool modules 142, user activity while using the development interface 126 can be recorded and used to train one or more of the AI tool modules 142, thereby enhancing the performance of AI code development tools. In particular, embodiments described herein train the various AI tools on user actions while developing computer code, rather than simply training AI tools on completed code. For example, the various tools may be trained based not only on the text file that comprises a program, but the keystrokes that led to development of that program, function calls, toggling between program files, movement within a development interface and within the code file, creating new files, renaming variables, inserting API information, and the like. According to one or more embodiments, the various AI tools may be performed on operational transformation. Operational transformation is a technique for supporting collaborative functionalities in collaborative software systems. In some embodiments, the IDE 124 may support collaborative software development. By training the AI tools on operational transformation, coding activities can be captured even among multiple users working on a single program. The set of AI tools thereby provides a machine learning-powered programmer that completes code in realtime, provides tools to generate, transform, and explain code, and provides an in-editor search utility that finds and imports code without requiring a user to leave the development interface 126.

FIG. 2 shows a flowchart of a technique for training an AI tool for code development, according to one or more embodiments. It should be understood that the particular flow of the flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

The flowchart 200 begins at block 205, where the system collects code entry data from a plurality of remote computing devices. For example, the network system 120 can collect code entry data from client A 102A, client B 102B, and clients C 102C. The code entry data may include, for example, all or part of source code entered in a development interface, user action taken within the development interface during source code entry, and the like. In some embodiments, as shown at block 210, collecting the code entry data can include collecting keystroke data, time information, and any other contextual data corresponding to code entry actions from a set of development interface instances. Further, as described above, code entry data may be collected from computer code analytics, stored computer programs, or the like.

According to some embodiments, some of the networks described herein are trained using additional training data. For example, a code generation network or a code transformation network may require natural language description along with one or more corresponding code segments. Further, with respect to the code explanation network, training data may include code segments along with natural language explanations of the code segments. In some embodiments, these explanations and corresponding segments may be obtained, for example, from an educational setting, a professional development setting, or the like. Other sources for training data include public repositories of code and data sets, user-provided code, natural language text, and the like.

The flowchart 200 continues at block 215, where a network is trained to predict an additional code segment using the code entry data. For example, with respect to the code completion network, a code completion network can be trained using the code entry data to predict a subsequent code segment based on a portion of computer code previously entered. In some embodiments, the network can be trained to consider code before a current cursor location in a code development interface. The network can also be trained to consider additional code or files, such as code segments appearing after a current cursor location, or an entire set of incomplete source code and/or other program data or program files accessible via the IDE or elsewhere on a computer network. Other networks can similarly consider various portions of a current program in development in predicting code segments. For example, a code generation network can generate a portion of code based on a natural language description of the target functionality of the requested computer code along with the current program. As another example, a code transformation network may utilize a portion of code of the current program along with a natural language description of a target transformation for the generated code. In doing so, the trained network is a form of generative AI, in which the network is trained to create new content based on input and the components from which the network was trained.

The flowchart concludes at block 220, where the trained network (or networks) is provided to one or more development sessions. As described above, the trained networks are comprised in the AI tools which are accessible by client devices via an IDE. As such, a user can utilize the various AI tools during a development session from a remote device. According to one or more embodiments, the various AI tools may be provided via an IDE session. This IDE session may support code development in numerous languages. In particular, the IDE may be configured to support multiple computer languages. As such, the AI tools can similarly be configured to support multiple languages, for example, through multiple networks trained for individual computer languages.

FIG. 3 shows a flowchart of a technique for utilizing a code completion network, according to one or more embodiments. It should be understood that the particular flow of the flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

The flowchart 300 begins at block 305, where an IDE receives a code segment of the program through user input. For example, the development interface for the IDE may include a text editor comprising a source code editor in which a user can type or otherwise enter computer code for a computer program.

According to some embodiments, the code completion network may be configured to continuously predict computer code based on source code entered by a user. As such, as source code is entered into the development interface, the flowchart continues to block 310, where a code segment is applied to the code completion network to predict a subsequent code segment and a confidence value associated with the subsequent code segment. The subsequent code segment predicted by the code completion network may include, for example, at least a portion of the line of code, a function, or some other subset of a source code file. In some embodiments, the confidence value may indicate a likelihood that the predicted subsequent code segment matches an intentionality of the user.

The flowchart 300 continues to block 315, where a determination is made as to whether the confidence value satisfies a confidence threshold. Said another way, a determination is made as to whether the confidence value is sufficiently high such that the predicted subsequent code segment should be provided to a user. The confidence threshold may be predetermined, or may be user defined. In addition, the confidence threshold may be based on a type of coding predicted, or other contextual information related to the program. The confidence threshold may also be adjusted based on the user's past interactions with the IDE, including code written or code suggestions previously accepted by the user.

If at block 315 a determination is made that the confidence value satisfies a confidence threshold, then the flowchart continues to block 320, where the code segment is presented in the integrated development environment. According to some embodiments, the code segment may be presented in a separate window or user interface component than the source code being edited. Alternatively, the code segment may be presented within the source code editor following a current cursor location. According to one or more embodiments, the code segment may be presented in a manner such that it is distinguishable from code entered by the user or otherwise incorporated into the source code. As such, the code segment may be provisionally inserted into the source code developed by the user.

At block 325, a determination is made as to whether the code segment is confirmed. The code segment may be confirmed in a number of ways. For example, a predefined user input action may indicate confirmation. In some embodiments, a user may press a tab key or otherwise provide some other form of predefined input, or swipe on a touchscreen displaying the source code. In some embodiments, a timeout function can be utilized such that upon expiration of a timeout period, the code segment will be automatically incorporated into source code. If at block 325, the code segment is confirmed, the flowchart concludes at block 330, and the code segment is incorporated into the program. According to one or more embodiments, upon incorporating the code segment into the program, a current cursor location moves to the end of the incorporated code segment. Further, in some embodiments, upon incorporation, the code segment may become editable by the user upon incorporation into the source code editor.

In some embodiments, a user may indicate that the code segment is not confirmed in a variety of ways. For example, the user can continue typing over, or in place of, the presented code segment. As another example, the user can provide a predefined user input to reject the code segment. Further, in some embodiments, a timeout function can be used such that upon expiration of the timeout period, the code segment will be removed. Thus, if at block 325 a determination is made that the code segment is not confirmed, then the flowchart 300 concludes at block 335, and the code segment is removed from display.

Returning to block 315, if a confidence value does not satisfy a confidence threshold, then the flowchart 300 continues to block 340, where the code completion network refrains from providing a predicted subsequent code segment and instead continues to receive user input code. The flowchart 300 can then continue to be repeated as user input is received to provide predicted subsequent code segments on demand.

FIGS. 4A-D depict example user interfaces for utilizing a code completion network in accordance with one or more embodiments.

Figure 4A:
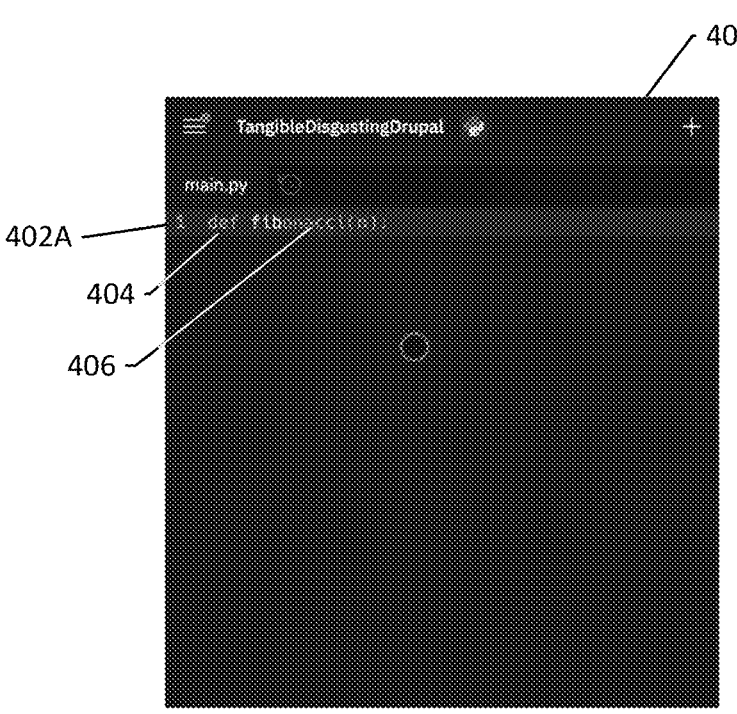

FIG. 4A shows an example text interface 400A in which a user can enter source code. In the example interface of FIG. 4A, the interface is a mobile device interface for a development environment. In this screenshot, a user has entered the string "def fib" 404 in a first line of code 402A. A code completion network has utilized the "def fib" string 404 and suggested a proposed code segment "onacci(n):" 406 which, if incorporated into the "main.py" file, would result in the text "def fibonacci(n):" in the first line 402A. The proposed code segment "onacci(n):" 406 is shown using different display characteristics than the user-entered code "def fib" 404 to indicate to a user that the code is suggested and is not yet part of the file, but is available to be incorporated into the file, for example by user selection.

Figure 4B:
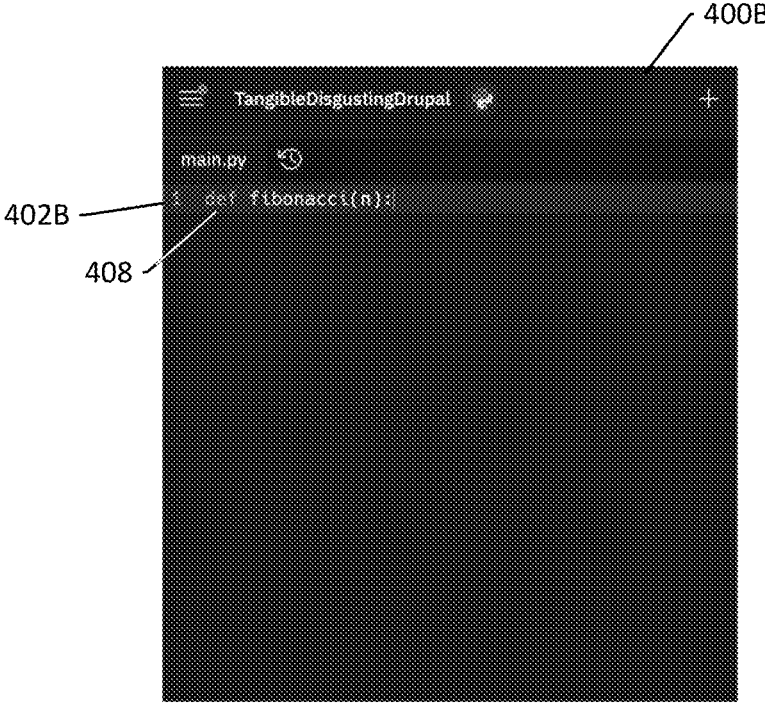

FIG. 4B shows an updated view of the example text interface 400B after the proposed code segment "onacci(n):" has been incorporated into the main.py file at the first line of code 402B. As described above, the proposed code can be incorporated into the program code in a variety of ways. For example, confirmation of the proposed code can be received based on a predefined user input, such as a swipe in a particular direction, input via a particular key or combination of keys, or the like. Upon incorporating the proposed code into the program file, the display characteristics of the proposed code may transform to match the display characteristics of source code in the program file. As shown here, the color of the remainder of the term "fibonacci" matches the display characteristics of "fib" in FIG. 4A. The result is that the first line 402B now includes the string "def fibonacci (n):" 408, which has been incorporated into the file.

In some embodiments, the code completion network can propose larger portions of computer code. Turning to FIG. 4C, a third version of the example text interface 400C is presented. Here, once the "def fibonacci(n):" line 402B is incorporated into the main.py file, then the code completion network may predict the next portion of code 408 to be:

```
if n== 0:
    return 0
elif n == 1:
    return 1
else:
    return fibonacci(n-1) +
    fibonacci(n-2)
```

Upon receiving a confirmation input, the IDE may incorporate the proposed code into the main.py file, as shown in FIG. 4D. In particular, in FIG. 4D, a fourth version of the example text interface 400D is presented. Here, once portion of code 408 is incorporated into the main.py file, then the incorporated portion of code 410 appears in a consistent style with the remaining code of the file. In some embodiments, once the portion of code 408 is incorporated, then a cursor location 412 is moved to the end of the incorporated portion of code 408, for example, at a next available line.

Figure 5:
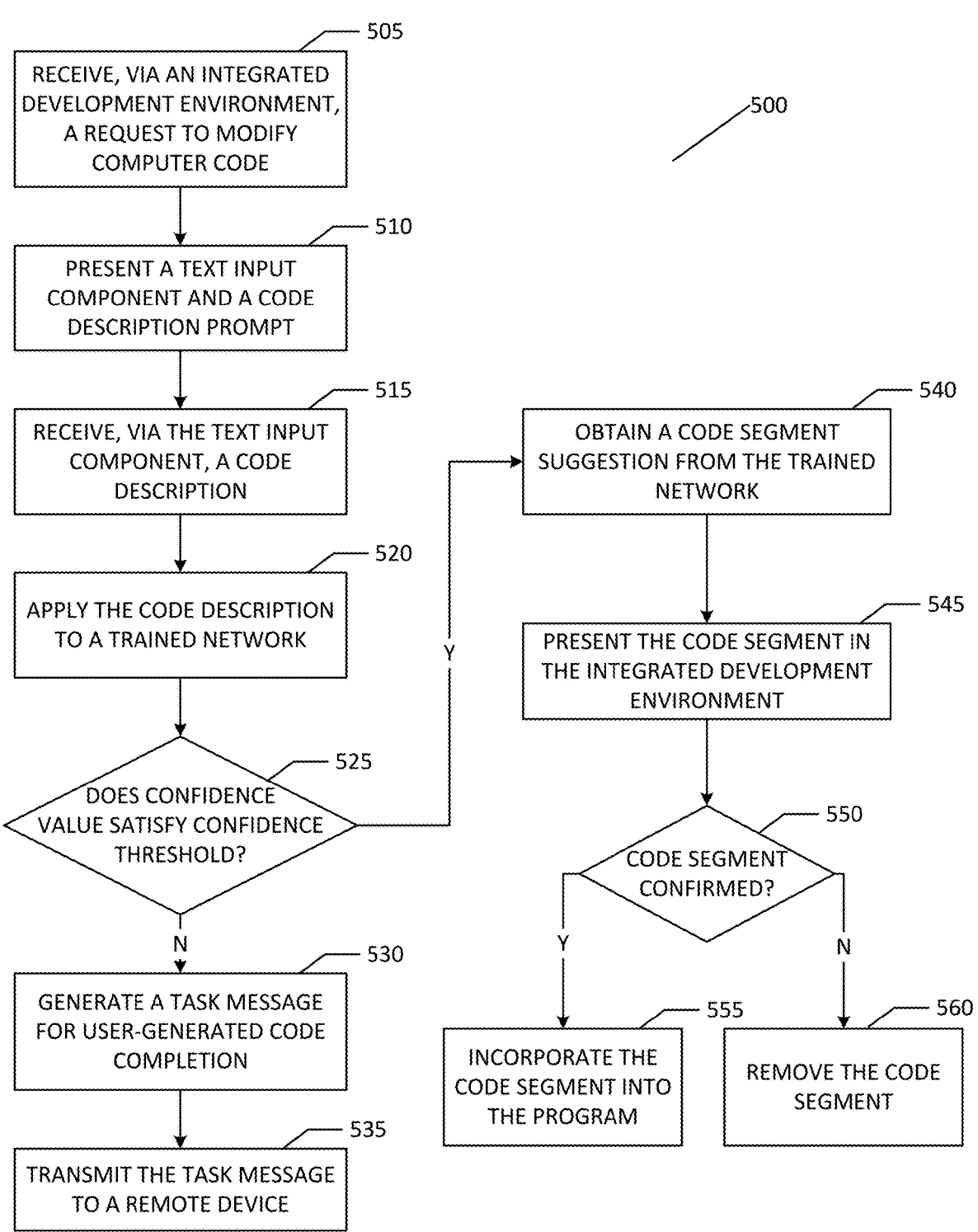
FIG. 5 shows a flowchart of a technique for intelligently generating computer code, according to one or more embodiments.

Some embodiments described herein are directed to a code generation network. As described above, a code generation network may generate computer code based on a natural language description of the intended functionality of the code. FIG. 5 depicts a flow chart 500 of a technique for generating computer code based on user input. It should be understood that the particular flow of the flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components for purposes of explanation, but should not be considered limited to those components.

The flowchart 500 begins at block 505, where a request to modify computer code is received via development interface. For purposes of the flowchart 500, modifying computer code may include generating new computer code or transforming computer code which has already been written. As such, the request may be received along with a selection of a portion of computer code which is to be transformed. In some embodiments, the request may be received via a menu item in a development interface for the IDE.

The flowchart continues to block 510, where a text input component is presented in the user interface along with a code description prompt. The code description prompt may prompt the user to enter a natural language description of the requested modification to the computer code. In the situation where a user is requesting new computer code to be generated, the code description prompt may prompt the user to enter a natural language description of the intended functionality of the computer code to be generated. In the example where the user has requested transformation of computer code, the code description prompt may request the user to enter a natural language description of the changes to be made to the selected computer code. Thus, at block 515, the code description is received via the text input component.

At block 520, the code description is applied to a trained network. For example, if the user has requested that new code be generated, the description may be applied to a code generation network. Similarly, if a transformation of the code is requested, then the description is applied to a transformation network.

According to one or more embodiments, the trained network may generate a confidence value along with computer code based on the request and associated description. The confidence value may indicate a likelihood that the output of the model matches and intent of the user making the request. At block 525, a determination is made as to whether the confidence value satisfies a confidence threshold. The confidence threshold may be a predetermined confidence value at which the output code is determined to be associated with a sufficient likelihood that it should be presented to the user. The confidence threshold may be a single value or multiple values. For example, a confidence threshold may be dependent upon the type of classification of the code being generated or transformed. Further, the confidence threshold may be based on other factors, such as a computer language, user information, user settings, or contextual information related to a program under development.

If at block 525 it is determined that the confidence value satisfies the confidence threshold, then the flowchart continues to block 540. At block 540, a code segment generated by the trained network is obtained. The code segment is presented in the IDE at block 545. In some embodiments, the code segment may be presented within a text editor as part of the computer code development. Alternatively, the code segment may be presented in a separate window or other UI component.

At block 550, determination is made as to whether the code segment is confirmed. The code segment may be confirmed in a number of ways. For example, a predefined user input action may indicate confirmation. As another example, a user may press a tab key or otherwise provide some other form of predefined input, or swipe on a touchscreen displaying the source code. In some embodiments, a timeout function can be such that upon expiration of a timeout period, the code segment will be automatically incorporated into source code. If at block 550, the code segment is confirmed, the flowchart concludes at block 555, and the code segment is incorporated into the program. According to one or more embodiments, upon incorporating the code segment into the program, a current cursor location will move to the end of the incorporated code segment. Further, in some embodiments, upon incorporation, the code segment may become editable by the user.

In some embodiments, a user may indicate that the code segment is not confirmed in a variety of ways. For example, the user can continue typing over, or in place of, the predicted code segment. As another example, the user can provide a predefined user input to reject the code segment, or affirmatively decline the code segment, for example via a user input component presented with the code segment. Further, in some embodiments, a timeout function can be used such that upon expiration of a timeout period, the code segment will be removed. Thus, if at block 550 a determination is made that the code segment is not confirmed, then the flowchart 500 concludes at block 560, and the code segment is removed from display.

Returning to block 525, if a confidence value does not satisfy a confidence threshold, then the flowchart 500 continues to block 530, where the code completion network generates a task message for user generated code completion. In one or more embodiments, the task message may include a description of the task and contextual information for the user request.

The flowchart 500 then concludes at block 535, where the task is transmitted or otherwise assigned to an additional user at a remote location, for example through the IDE. According to one or more embodiments, the task message may include an automatically generated posting to a marketplace where human creators can review the posting and generate code aligned with the natural language description received at block 515. A creator can apply to accept the task. In some embodiments, an applicant creator can be accepted automatically, by user acceptance, or some combination thereof. Upon the creator completing the task, the resulting code may be provided to the requesting input. Further, in some embodiments, the resulting code and/or the coding activities that resulted in the code by the creator may be captured as additional training data for the various AI tools.

Figure 6A:
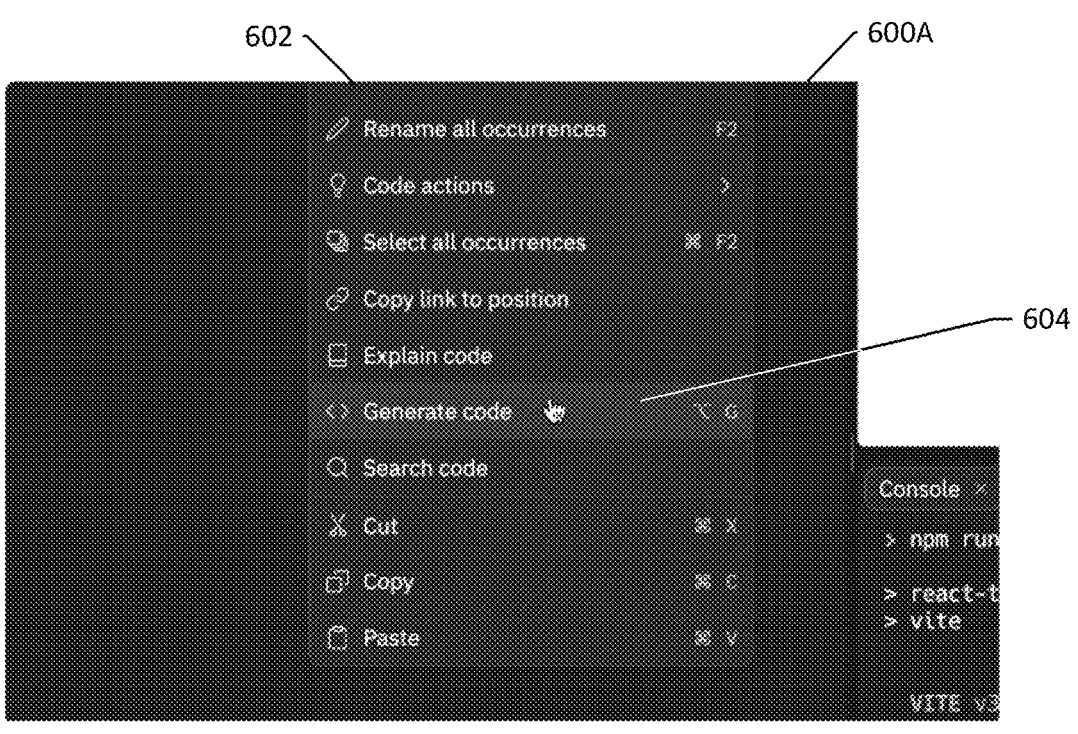
FIGS. 6A-6D show example user interfaces for code generation functionality, in accordance with one or more embodiments.

FIGS. 6A-D show example user interfaces for code generation functionality, in accordance with one or more embodiments. FIG. 6A depicts a first view of a development interface 600A having a menu 602 from which a user selecting a menu option 604 to generate code. In some embodiments, the menu option 604 is presented as part of an interface for a text editor for a development interface. The menu may be presented, for example, as a drop down menu, a tile or panel on an interface, or the like.

Figure 6B:
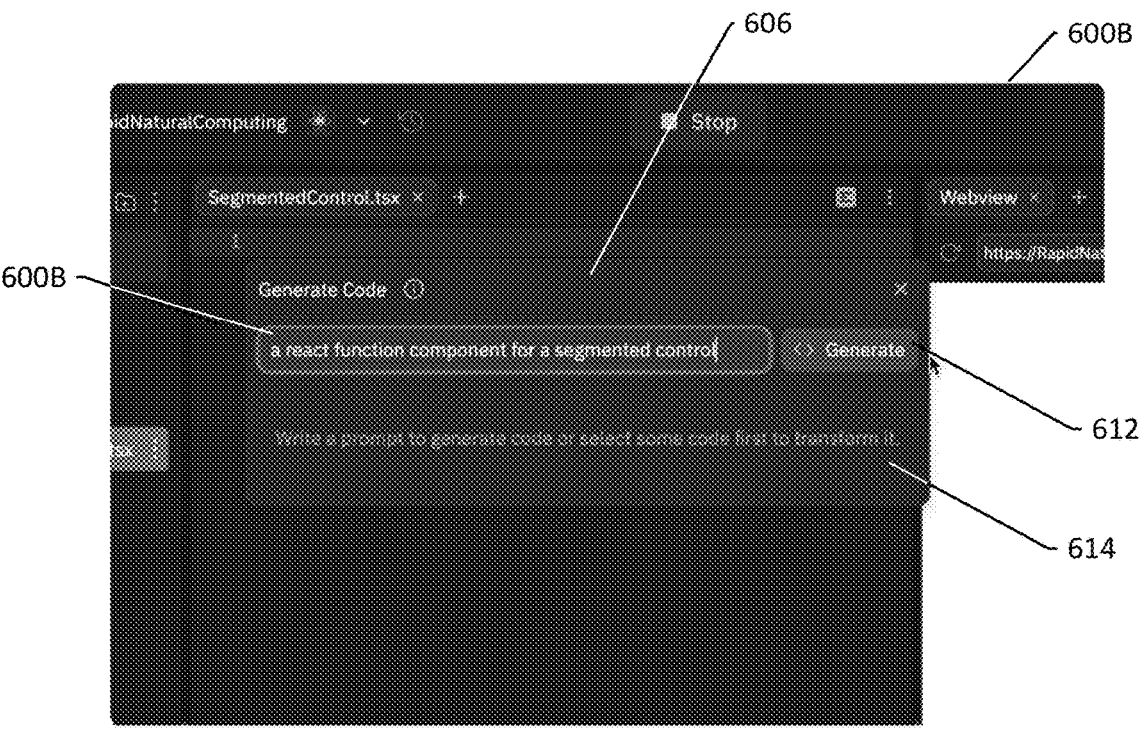

FIG. 6B shows an updated view of the development interface 600B upon the user selection of the menu option 604. In response to the request to generate code, the IDE presents a display component having a user input component 610 along with a prompt 608 directing a user to enter a description of the requested code. In this example, the user input component 610 and prompt 608 are presented as part of a new user input region separate from the text editor (i.e., a new window 606). Here, the prompt 608 says, "Write a prompt to generate code or select some code first to transform it." The prompt is presented along with a text input component 610 where a user can input a natural language description. For purposes of the example of FIG. 6B, the description reads "a react code function component for a segment control." The text box is presented with a selectable input component 612 which, when selected, causes the description to be applied to a code generation network.

Figure 6C:
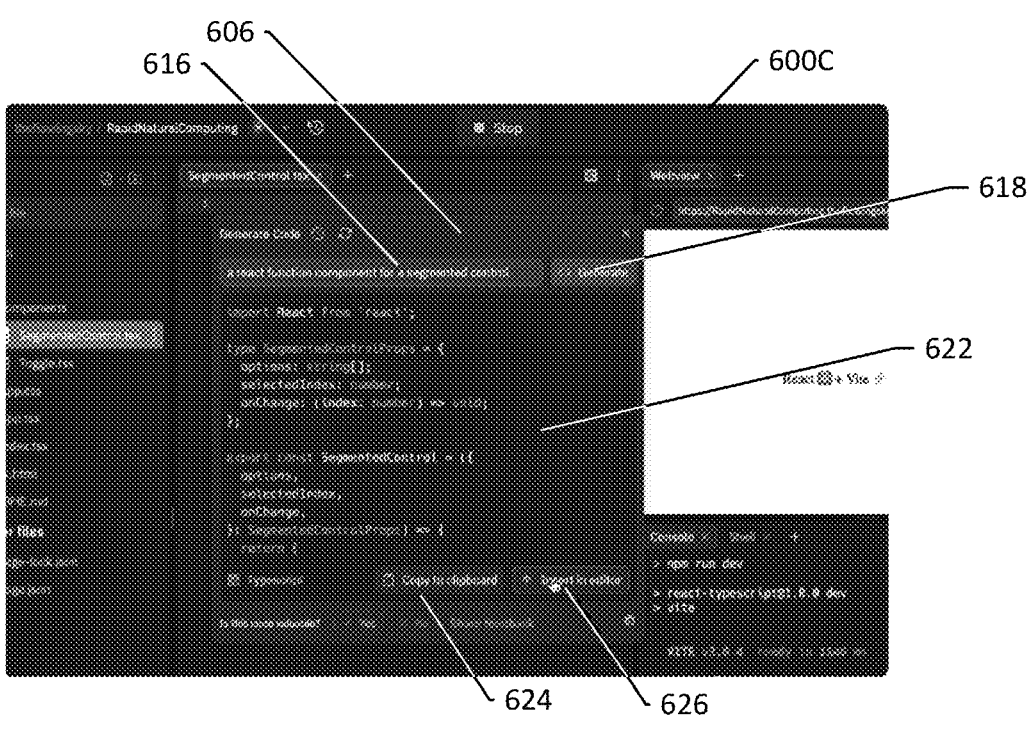

FIG. 6C shows an updated view of the development interface 600C upon code generation network predicting a set of proposed code. In the new window 606, a set of proposed code 622 generated by the code generation network is presented. In some embodiments, the code is provided along with a user input component 624 which, when selected, causes the generated code to be copied to a clipboard. The code may also be provided with a user input component 626 which, when selected, causes the generated code to be incorporated into the program from which the request was initiated. According to some embodiments, the new window 606 may include a user input component 616 in which a user can enter a new or updated description for code. The user input component 616 may be presented in association with a selectable component 618 which, when selected, causes the description to be applied to a code generation network.

Figure 6D:
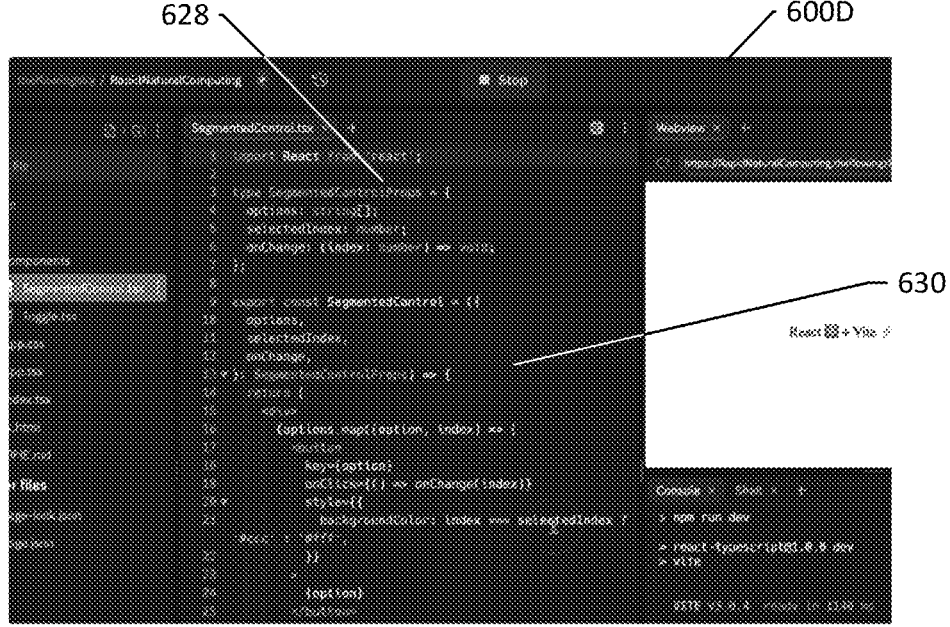

Upon receiving a user selection to insert the code into the editor, the code is presented in the text editor, as shown in the updated view of the development interface 600D of FIG. 6D. In some embodiments, the generated code 630 is incorporated into the rest of the file 628, and becomes editable upon being incorporated in the text editor.

Figure 7A:
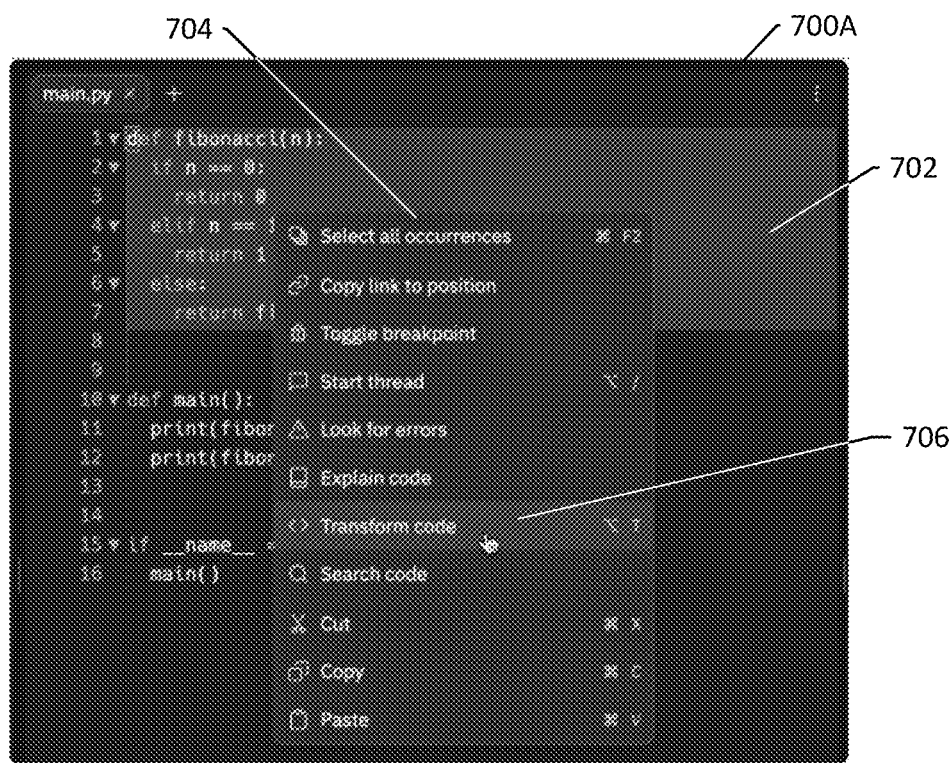
FIGS. 7A-7D show example user interfaces for code generation functionality, in accordance with one or more embodiments.

FIGS. 7A-D show example user interfaces for code generation functionality, in accordance with one or more embodiments. FIG. 7A depicts a view of a development interface 700A in which a user is selecting a menu option 706 to transform code from a menu 704. In some embodiments, the menu option 706 is presented as part of an interface for a text editor for an IDE. In some embodiments, the transform code option becomes selectable when the user has selected a portion of code to transform, as shown by selected code 702. The menu 704 can be presented, for example, as part of a menu bar or window of a development interface, or may be available using a right click or other similar user action.

Figure 7B:
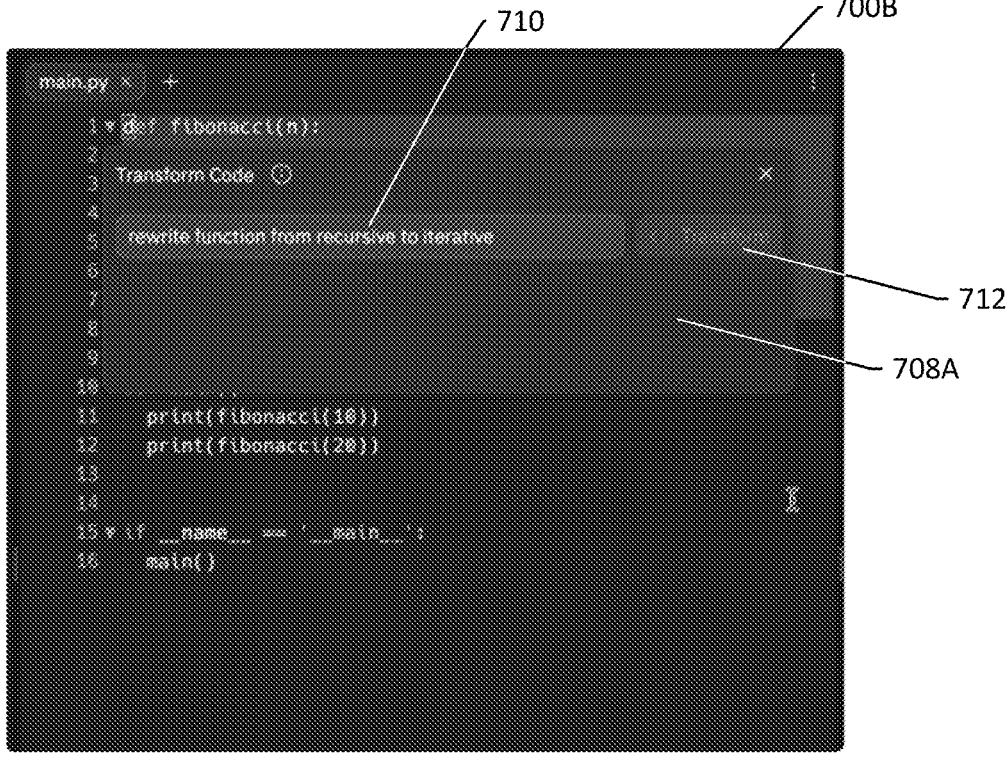

FIG. 7B shows an updated development interface 700B upon the menu option being selected. In response to the request to transform code, the development interface 700B presents a user input component 710. In some embodiments, the user input component is presented along with a prompt 712 directing a user to enter a description of the requested modification to the selected code. In this example, the user input component is presented as part of a new user input region 708A separate from the text editor (i.e., a new window). The input component provides an interface for a user to input a natural language description of the modifications to the code. For purposes of the example of FIG. 7B, the description reads "rewrite function from recursive to iterative." The text box is presented with a user input component which, when selected, causes the description to be applied to a code generation network.

Figures 7C, 7D:
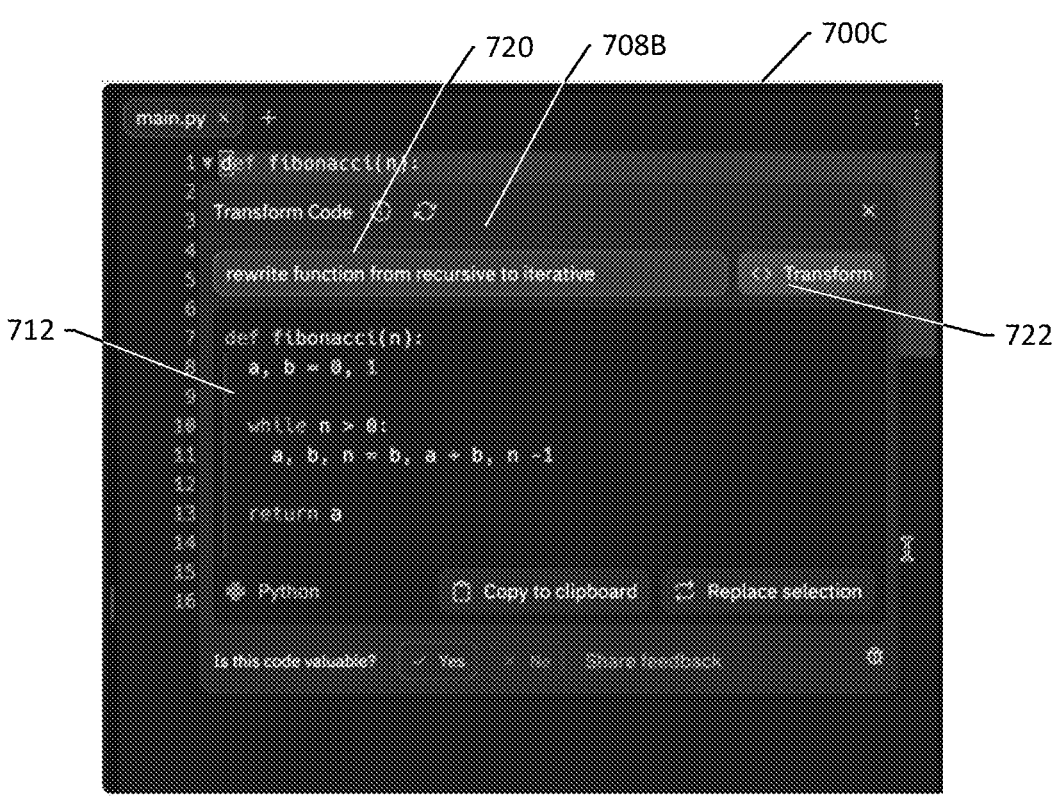

FIG. 7C shows an updated development interface 700C upon the description being entered. In the user input region 708B, a set of proposed modified code 712 generated by the code transformation network is presented. In some embodiments, the code is provided along with a user input component 714 which, when selected, causes the generated code to be copied to a clipboard. The code may also be provided with a user input component 716 which, when selected, causes the generated code to replace the code currently selected in the text editor. According to some embodiments, the new window 708B may include a user input component 720 in which a user can enter a new or updated description for code. The user input component 720 may be presented in association with a selectable component 722 which, when selected, causes the description to be applied to a code generation network.

Upon receiving a user selection to replace the code in the editor, the code is presented in the text editor in place of the selected code, as shown in the updated view of the development environment 700D of FIG. 7D. In some embodiments, the generated code 724 becomes editable upon being incorporated in the text editor. Further, the cursor location 726 may be updated to a location following the incorporated code.

FIG. 8 shows example screenshots for code explanation functionality, in accordance with one or more embodiments. In a first example screenshot 800A, a user selects a portion of code 802 to be explained. The second screenshot 800B depicts a user selecting a menu option 804 to explain code. In some embodiments, the menu option 802 is presented as part of an interface for a text editor for a development interface. In some embodiments, the explain code option 802 becomes selectable when the user has selected a portion of code. In accordance with some embodiments, upon selection of the explain code option, the selected code is applied to a code explanation network.

In response to the request to explain code, the development interface presents a user interface component 806 including a natural language explanation of the selected computer code, as shown in the third screenshot 800C. The explanation is presented with a user input component 808 which, when selected, causes the user interface component to be closed and the user to return to the text editor.

Figure 9:
FIG. 9 shows example user interfaces for intelligent conversational assistant functionality, in accordance with one or more embodiments.

FIG. 9 shows example screenshots for a development interface having an interface corresponding to an intelligent conversational assistant, in accordance with one or more embodiments. In a first example screenshot 900A, a user enters a description 902, "In HTML, make a website about Replit's Ghostwriter." Notably, the description is entered into an input component 904 in the interface associated with the intelligent conversation assistant, and is presented within a current program 906 the user is working on. Here, the program is related to a simple personal website, as shown by the HTML code in the right window of the interface. In response to the prompt, the intelligent conversation assistant generates a response 908 having a set of HTML providing a title of "Replit Ghostwriter," with the phrase "Replit Ghostwriter" in the body.

As described above, computer code generated by the intelligent conversational assistant can be incorporated into a current program either automatically or in response to use input. The second screenshot 900B depicts a user having incorporated the generated code into the program 906B, within the code editor interface.

The third screenshot 900C shows a user providing an additional description 910, which directs the intelligent conversational assistant to "rewrite the website from scratch including the poem and the image. Make it a dark mode website that has a purple accent color and center the content. Make the UI look professional like Replit's landing page." In response to the description 910, the intelligent conversational assistant generates HTML code based on the subject program from which the prompt is entered, and generates the replacement code 912 accordingly. As such, the intelligent conversational assistant is configured to utilize contextual clues from the program 906 from which the prompt is provided to generate an appropriate response to the user prompt.

Figure 10:
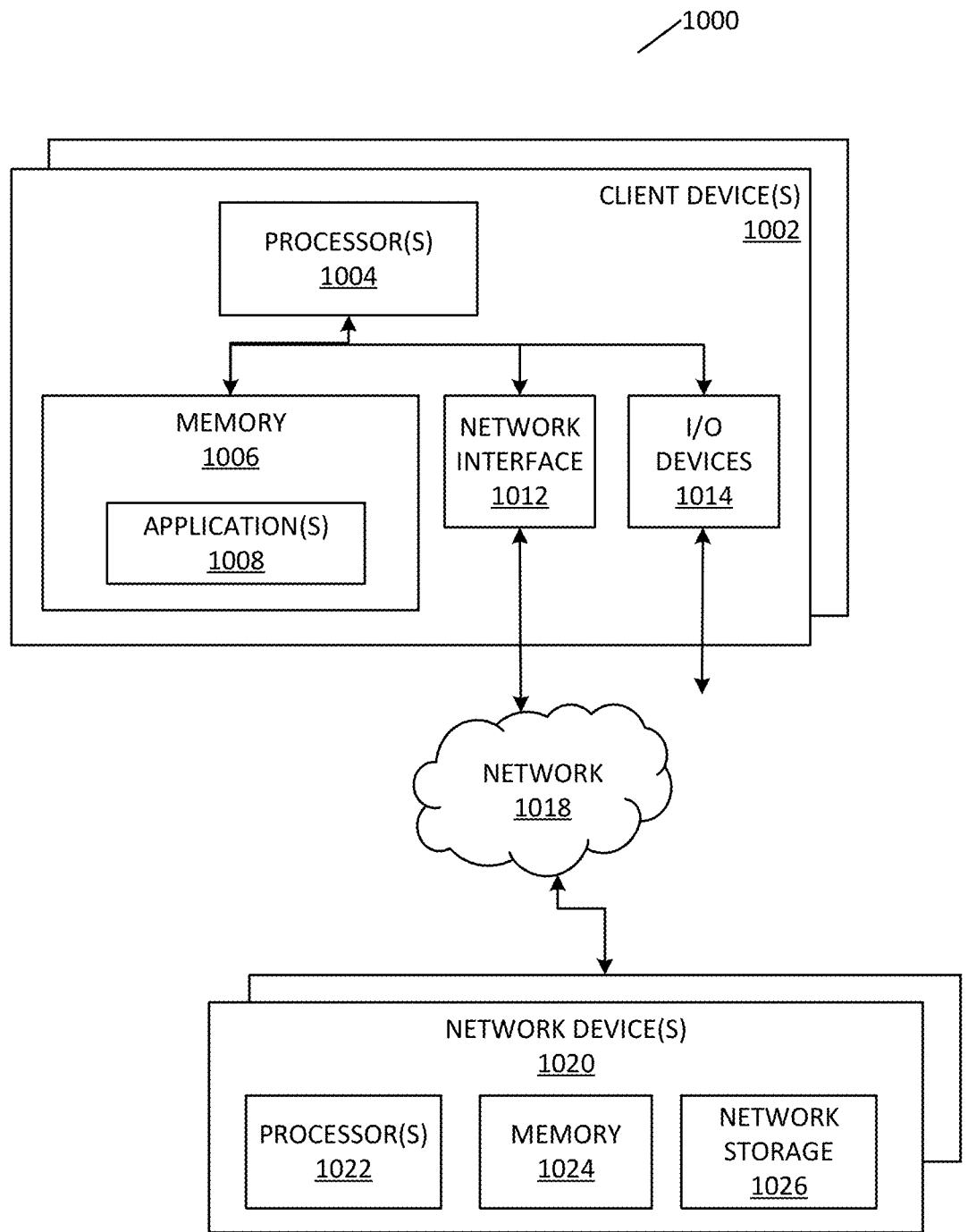
FIG. 10 shows an example network diagram in accordance with the disclosed embodiments.

FIG. 10 shows an example of a hardware system for implementation of the multiplayer debugger in accordance with the disclosed embodiments. FIG. 10 depicts a network diagram 1000 including a client computing device 1002 connected to one or more network devices 1020 over a network 1018. Client device 1002 may comprise a personal computer, a tablet device, a smart phone, network device, or any other electronic device which may be used to perform debugging operations on a computer program. The network 1018 may comprise one or more wired or wireless networks, wide area networks, local area networks, enterprise networks, short range networks, and the like. The client computing device 1002 can communicate with the one or more network devices 1020 using various communication-based technologies, such as Wi-Fi, Bluetooth, cable connections, satellite, and the like. Users of the client devices 1002 can interact with the network devices 1020 to access services controlled and/or provided by the network devices 1020.

Client devices 1002 may include one or more processors 1004. Processor 1004 may include multiple processors of the same or different type, and may be configured to execute computer code or computer instructions, for example computer readable code stored within memory 1006. For example, the one or more processors 1004 may include one or more of a central processing unit (CPU), graphics processing unit (GPU), or other specialized processing hardware. In addition, each of the one or more processors may include one or more processing cores. Client devices 1002 may also include a memory 1006. Memory 1006 may each include one or more different types of memory, which may be used for performing functions in conjunction with processor 1004. In addition, memory 1006 can include one or more of transitory and/or non-transitory computer readable media. For example, memory 1006 may include cache, ROM, RAM, or any kind of computer readable storage device capable of storing computer readable code. Memory 1006 may store various programming modules and applications 1008 for execution by processor 1004. Examples of memory 1006 include magnetic disks, optical media such as CD-ROMs and digital video disks (DVDs), or semiconductor memory devices.

Computing device 1002 also includes a network interface 1012 and I/O devices 1014. The network interface 1012 may be configured to allow data to be exchanged between computing devices 1002 and/or other devices coupled across the network 1018. The network interface 1012 may support communication via wired or wireless data networks. Input/output devices 1014 may include one or more display devices, keyboards, keypads, touchpads, mice, scanning devices, voice or optical recognition devices, or any other devices suitable for entering or retrieving data by one or more client devices 1002.

Network devices 1020 may include similar components and functionality as those described in client devices 1002. Network devices 1020 may include, for example, one or more servers, network storage devices, additional client devices, and the like. Specifically, network device may include a memory 1024, network storage 1026, and/or one or more processors 1022. The one or more processors 1022 can include, for example, one or more of a central processing unit (CPU), graphics processing unit (GPU), or other specialized processing hardware. In addition, each of the one or more processors 1022 may include one or more processing cores. Each of memory 1024 and network storage 1026 may include one or more of transitory and/or non-transitory computer readable media, such as magnetic disks, optical media such as CD-ROMs and digital video disks (DVDs), or semiconductor memory devices. While the various components are presented in a particular configuration across the various systems, it should be understood that the various modules and components may be differently distributed across the network.

According to some embodiments, limited user information may be used to perform techniques described herein. For example, user-generated content, user input, keystrokes, computer code, and the like may be tracked and used as training data for AI tools described herein. Other electronic tools may be used to collect information such as cookies, pixel tags, and similar technologies. It should be understood that the privacy of individuals who use the IDE and the AI tools described herein is protected under relevant privacy policies. In some embodiments, user information may be collected upon agreement of the end user to participate in such efforts in accordance with the relevant privacy policies.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer readable medium storing computer readable code executable by one or more processors to:

present a development interface of an integrated development environment (IDE), wherein the IDE is a computer program that comprises a plurality of software tools, and wherein the plurality of software tools comprise a code editor, a debugger, an intelligent conversational assistant, and one or more generative artificial intelligence tools;

receive, in the IDE, a natural language prompt indicating a target functionality for computer code of a first program file under development in a natural language interface of an interface of the intelligent conversational assistant, wherein the development interface of the IDE concurrently presents the natural language interface of the interface of the intelligent conversational assistant and a code editor interface of the code editor comprising the computer code of the first program file under development;

obtain, by the IDE, input data comprising the natural language prompt, the computer code of the first program file under development, and one or more additional program files under development in accordance with a reference in the first program file under development to the one or more additional program files under development;

apply, by the IDE, the input data to at least one generative artificial intelligence tool of the one or more generative artificial intelligence tools comprising one or more large language models to obtain suggested computer code for the first program file under development, wherein the one or more large language models are configured to create new computer code based on training data on which the one or more large language models were trained, and wherein the one or more generative artificial intelligence tools are configured to generate the suggested computer code based on the natural language prompt, the computer code of the first program file under development, and the one or more additional program files under development; and present, in the interface of the intelligent conversational assistant, the suggested computer code and an input component which, when selected, causes the suggested computer code to be incorporated into the first program file under development in the code editor interface of the code editor.

2. The non-transitory computer readable medium of claim 1, further storing computer readable code to:

present a confirmation prompt in accordance with the suggested computer code; and in accordance with receiving a confirmation to the confirmation prompt, incorporate the suggested computer code into the first program file under development in the code editor interface of the code editor.

3. The non-transitory computer readable medium of claim 1, further storing computer readable code to:

automatically incorporate the suggested computer code into the first program file under development in the code editor interface of the code editor.

4. The non-transitory computer readable medium of claim 1, wherein the natural language prompt is received from a debugger module, and wherein the natural language prompt indicates a detected error in the first program file under development, and further storing computer readable code to:

predict a solution to the detected error using the one or more generative artificial intelligence tools;

generate a natural language explanation of the detected error and the solution using the one or more generative artificial intelligence tools; and present the solution and the natural language explanation of the detected error in the interface of the intelligent conversational assistant.

5. The non-transitory computer readable medium of claim 1, wherein the one or more generative artificial intelligence tools comprise at least one selected from a group consisting of: a code completion network, a code generation network, a code explanation network, and a code transformation network.

6. A system comprising:

one or more processors; and one or more non-transitory computer readable media executable by the one or more processors to:

present a development interface of an integrated development environment (IDE), wherein the IDE is a computer program that comprises a plurality of software tools, and wherein the plurality of software tools comprise a code editor, a debugger, an intelligent conversational assistant, and one or more generative artificial intelligence tools;

receive, in the IDE, a natural language prompt indicating a target functionality for computer code of a first program file under development in a natural language interface of an interface of the intelligent conversational assistant, wherein the development interface of the IDE concurrently presents the natural language interface of the interface of the intelligent conversational assistant and a code editor interface of the code editor comprising the computer code of the first program file under development;

obtain, by the IDE, input data comprising the natural language prompt, the computer code of the first program file under development, and one or more additional program files under development in accordance with a reference in the first program file under development to the one or more additional program files under development;

apply, by the IDE, the input data to at least one generative artificial intelligence tool of the one or more generative artificial intelligence tools comprising one or more large language models to obtain suggested computer code for the first program file under development, wherein the one or more large language models are configured to create new computer code based on training data on which the one or more large language models were trained, and wherein the one or more generative artificial intelligence tools are configured to generate the suggested computer code based on the natural language prompt, the computer code of the first program file under development, and the one or more additional program files under development; and present, in the interface of the intelligent conversational assistant, the suggested computer code and an input component which, when selected, causes the suggested computer code to be incorporated into the first program file under development in the code editor interface of the code editor.

7. The system of claim 6, further storing computer readable code to:

present a confirmation prompt in accordance with the suggested computer code; and in accordance with receiving a confirmation to the confirmation prompt, incorporate the suggested computer code into the first program file under development in the code editor interface of the code editor.

8. The system of claim 6, wherein the natural language prompt is received from a debugger module, and wherein the natural language prompt indicates a detected error in the first program file under development, and further storing computer readable code to:

predict a solution to the detected error using the one or more generative artificial intelligence tools;

generate a natural language explanation of the detected error and the solution using the one or more generative artificial intelligence tools; and present the solution and the natural language explanation of the detected error in the interface of the intelligent conversational assistant.

9. The system of claim 6, wherein the one or more generative artificial intelligence tools comprise at least one selected from a group consisting of: a code completion network, a code generation network, a code explanation network, and a code transformation network.

10. A method comprising:

presenting a development interface of an integrated development environment (IDE), wherein the IDE is a computer program that comprises a plurality of software tools, and wherein the plurality of software tools comprise a code editor, a debugger, an intelligent conversational assistant, and one or more generative artificial intelligence tools;

receiving, in the IDE, a natural language prompt indicating a target functionality for computer code of a first program file under development in a natural language interface of an interface of the intelligent conversational assistant, wherein the development interface of the IDE concurrently presents the natural language interface of the interface of the intelligent conversational assistant and a code editor interface of the code editor comprising the computer code of the first program file under development;

obtaining, by the IDE, input data comprising the natural language prompt, the computer code of the first program file under development, and one or more additional program files under development in accordance with a reference in the first program file under development to the one or more additional program files under development;

applying, by the IDE, the input data to at least one generative artificial intelligence tool of the one or more generative artificial intelligence tools comprising one or more large language models to obtain suggested computer code for the first program file under development, wherein the one or more large language models are configured to create new computer code based on training data on which the one or more large language models were trained, and wherein the one or more generative artificial intelligence tools are configured to generate the suggested computer code based on the natural language prompt, the computer code of the first program file under development, and the one or more additional program files under development; and presenting, in the interface of the intelligent conversational assistant, the suggested computer code and an input component which, when selected, causes the suggested computer code to be incorporated into the first program file under development in the code editor interface of the code editor.

11. The method of claim 10, further comprising:

presenting a confirmation prompt in accordance with the suggested computer code; and in accordance with receiving a confirmation to the confirmation prompt, incorporating the suggested computer code into the first program file under development in the code editor interface of the code editor.

12. The method of claim 10, further comprising:

automatically incorporate the suggested computer code into the first program file under development in the code editor interface of the code editor.

13. The method of claim 10, wherein the natural language prompt is received from a debugger module, and wherein the natural language prompt indicates a detected error in the first program file under development, and further comprising:

predicting a solution to the detected error using the one or more generative artificial intelligence tools;

generating a natural language explanation of the detected error and the solution using the one or more generative artificial intelligence tools; and presenting the solution and the natural language explanation of the detected error in the interface of the intelligent conversational assistant.

14. The method of claim 10, wherein the one or more generative artificial intelligence tools comprise at least one selected from a group consisting of: a code completion network, a code generation network, a code explanation network, and a code transformation network.

* * * * *